US008675856B2

(12) United States Patent
Scholes et al.

(10) Patent No.: US 8,675,856 B2
(45) Date of Patent: Mar. 18, 2014

(54) MEDIA TERMINAL ADAPTER (MTA) ROUTING OF TELEPHONE CALLS BASED ON CALLER IDENTIFICATION INFORMATION

(75) Inventors: Bryan W. Scholes, Cumming, GA (US); James M. Burns, Jr., Dacula, GA (US)

(73) Assignee: Cisco Technology, Inc., San Jose, CA (US)

( * ) Notice: Subject to any disclaimer, the term of this patent is extended or adjusted under 35 U.S.C. 154(b) by 1462 days.

(21) Appl. No.: 11/461,487

(22) Filed: Aug. 1, 2006

(65) Prior Publication Data

US 2008/0043970 A1 Feb. 21, 2008

(51) Int. Cl.
*H04M 7/00* (2006.01)
(52) U.S. Cl.
USPC ..................................... 379/220.01; 370/352
(58) Field of Classification Search
USPC ............................ 379/88.19, 201.02, 220.01, 379/167.01–184; 370/352
See application file for complete search history.

(56) References Cited

U.S. PATENT DOCUMENTS

| 4,689,801 | A | 8/1987 | Nurczyk et al. |
| 5,544,235 | A | 8/1996 | Ardon |
| 5,546,447 | A | 8/1996 | Skarbo et al. |
| 5,684,988 | A | 11/1997 | Pitchaikani et al. |
| 5,699,419 | A | 12/1997 | Ardon |
| 5,799,060 | A | 8/1998 | Kennedy et al. |
| 5,937,034 | A | 8/1999 | Kennedy et al. |
| 6,005,921 | A | 12/1999 | Keefe et al. |
| 6,122,348 | A | 9/2000 | French-St. George et al. |
| 6,324,263 | B1 * | 11/2001 | Sherwood et al. ......... 379/88.19 |
| 6,898,274 | B1 * | 5/2005 | Galt et al. ................ 379/211.02 |
| 6,937,713 | B1 | 8/2005 | Kung et al. |
| 6,940,866 | B1 * | 9/2005 | Miller et al. .................. 370/426 |
| 6,985,492 | B1 | 1/2006 | Thi et al. |
| 7,002,995 | B2 | 2/2006 | Chow et al. |
| 7,006,479 | B1 | 2/2006 | Joo et al. |
| 7,010,002 | B2 * | 3/2006 | Chow et al. ................... 370/485 |

(Continued)

FOREIGN PATENT DOCUMENTS

| CA | 2310982 A1 | 12/2000 |
| CN | 1108449 A | 5/2003 |

(Continued)

OTHER PUBLICATIONS

"Access and Terminals (AT); IPCablecom Access Network; End to End Provisioning for the IPAT Architecture (Between the eMTA to the V5.2 Interface); ETSI TR 102 305," ETSI Standards, European Telecommunications Standards Institute, Sophia-Antipo, FR, vol. AT-Digital, No. V111, Mar. 2004, XPO14015619 ISSN: 0000-0001; p. 15-17, line 18, p. 31.

(Continued)

*Primary Examiner* — Oleg Asanbayev
(74) *Attorney, Agent, or Firm* — Merchant & Gould

(57) ABSTRACT

Systems and methods are disclosed for a media terminal adapter (MTA) that contains a routing table for routing incoming telephone calls based on caller identification information. The MTA is coupled to a router/hub, where all digital telephones are then connected to the router/hub. Any analog telephones are connected to the MTA. The routing table defines incoming calls using their caller identification information and associates each defined call with a corresponding telephone(s). In this manner, an incoming call that is intended for one predominant telephone user is routed to the desired telephone using the telephone's IP address or a physical connection interface.

14 Claims, 4 Drawing Sheets

(56) References Cited

U.S. PATENT DOCUMENTS

| | | | |
|---|---|---|---|
| 7,013,000 B2* | 3/2006 | Bortolini et al. | 379/93.05 |
| 7,068,757 B1 | 6/2006 | Burnett | |
| 7,103,067 B1 | 9/2006 | Singh et al. | |
| 7,116,771 B2 | 10/2006 | Charania et al. | |
| 7,123,692 B2 | 10/2006 | Atkinson et al. | |
| 7,145,887 B1 | 12/2006 | Akgun et al. | |
| 7,263,111 B1 | 8/2007 | Davis et al. | |
| 7,280,532 B2 | 10/2007 | Um | |
| 7,295,566 B1 | 11/2007 | Chiu et al. | |
| 7,333,492 B2 | 2/2008 | Wu et al. | |
| 7,447,780 B2 | 11/2008 | McMahon et al. | |
| 7,502,457 B2* | 3/2009 | McBlain et al. | 379/210.01 |
| 7,505,759 B1 | 3/2009 | Rahman | |
| 7,656,889 B2* | 2/2010 | Jeon et al. | 370/428 |
| 7,701,954 B2 | 4/2010 | Rabenko et al. | |
| 7,860,230 B2* | 12/2010 | Martin | 379/210.02 |
| 8,233,491 B2 | 7/2012 | Burns | |
| 8,363,805 B2 | 1/2013 | Burns, Jr. et al. | |
| 8,526,583 B2 | 9/2013 | Burns, Jr. | |
| 2001/0055376 A1* | 12/2001 | Karas | 379/142.02 |
| 2002/0037004 A1* | 3/2002 | Bossemeyer et al. | 370/356 |
| 2002/0064259 A1 | 5/2002 | Tsai | |
| 2002/0106017 A1 | 8/2002 | Dombkowski et al. | |
| 2002/0114431 A1 | 8/2002 | McBride et al. | |
| 2002/0150081 A1 | 10/2002 | Fang | |
| 2003/0007617 A1* | 1/2003 | McAlinden | 379/201.02 |
| 2003/0108176 A1 | 6/2003 | Kung et al. | |
| 2004/0008724 A1 | 1/2004 | Devine et al. | |
| 2004/0028208 A1 | 2/2004 | Carnazza et al. | |
| 2004/0066913 A1 | 4/2004 | Kennedy et al. | |
| 2004/0090968 A1 | 5/2004 | Kimber et al. | |
| 2004/0114747 A1 | 6/2004 | Trandal et al. | |
| 2004/0170268 A1 | 9/2004 | Hakusui | |
| 2004/0208177 A1 | 10/2004 | Ogawa | |
| 2004/0249927 A1 | 12/2004 | Pezutti | |
| 2005/0018651 A1 | 1/2005 | Yan et al. | |
| 2005/0047423 A1 | 3/2005 | Kaul et al. | |
| 2005/0078689 A1 | 4/2005 | Sharma et al. | |
| 2005/0114518 A1 | 5/2005 | McMahon et al. | |
| 2005/0180393 A1 | 8/2005 | Skubisz | |
| 2005/0190891 A1 | 9/2005 | Shah et al. | |
| 2005/0198391 A1 | 9/2005 | Coldren | |
| 2005/0216949 A1 | 9/2005 | Candelora et al. | |
| 2006/0285487 A1 | 12/2006 | Yasuie et al. | |
| 2006/0291643 A1* | 12/2006 | Pfaff et al. | 379/221.12 |
| 2007/0133516 A1 | 6/2007 | Stein | |
| 2007/0133776 A1* | 6/2007 | Jain et al. | 379/231 |
| 2007/0140445 A1 | 6/2007 | Ito | |
| 2007/0168462 A1 | 7/2007 | Grossberg et al. | |
| 2007/0198681 A1 | 8/2007 | Bakke et al. | |
| 2007/0201473 A1 | 8/2007 | Bhatia et al. | |
| 2007/0201481 A1 | 8/2007 | Bhatia et al. | |
| 2007/0218866 A1 | 9/2007 | MacIver et al. | |
| 2007/0274213 A1 | 11/2007 | Stephan et al. | |
| 2007/0297384 A1 | 12/2007 | Burns et al. | |
| 2008/0043927 A1 | 2/2008 | Lysaght et al. | |
| 2008/0080680 A1 | 4/2008 | Burns | |
| 2008/0080690 A1 | 4/2008 | Burns | |
| 2008/0123627 A1 | 5/2008 | Moreman et al. | |
| 2008/0168517 A1 | 7/2008 | Allen | |
| 2009/0143013 A1* | 6/2009 | Hatano et al. | 455/41.3 |
| 2009/0185665 A1 | 7/2009 | Chen | |

FOREIGN PATENT DOCUMENTS

| | | |
|---|---|---|
| CN | 1711744 A | 12/2005 |
| WO | WO 03028355 | 4/2003 |
| WO | WO 03/077509 | 9/2003 |
| WO | WO2004/045130 | 5/2004 |
| WO | WO 2006/015013 A2 | 2/2006 |
| WO | WO 2007/149708 A2 | 12/2007 |
| WO | WO 2008/016864 A1 | 2/2008 |
| WO | WO 2008/039719 A2 | 4/2008 |
| WO | WO 2008/039721 A2 | 4/2008 |
| WO | WO 2008/042636 A2 | 4/2008 |

OTHER PUBLICATIONS

Gordon Beacham Motorola et al., "Network Control Signaling (NCS) Signaling MIB for PacketCable and IPCablecom Multimedia Terminal Adapters (MTAs); draft-ietf-ipcdn-pktc-signaling-02.txt;" IETF Standard-Working-Draft; Internet Engineering Task Force, IETF, CH, vol. ipcdn, No. 2, Oct. 2003, XP015019953 ISSN: 0000-0004; p. 3, p. 27.

Eugene Nechamkin Broadcom Corp, Jean-Francois Mule Cablelabs: "Multimedia Terminal Adapter (MTA) Management Information Base for PacketCable and IPCablecom compliant devices; draft-ietf-ipcdn-pktc-mtamib-06.txt;" IETF Standard-Working-Draft, Internet Engineering Task Force, IETF, CH, vol. ipcdn, No. 6, Jan. 21, 2005, XP015019952, ISSN: 0000-0004, pp. 5-7, p. 28, line 29.

U.S. Appl. No. 11/425,862, filed Jun. 22, 2006, Entitled "Media Terminal Adapter Initialization Process Display by Use of an Embedded Caller Name and Caller Identification," Inventors: Burns et al.

U.S. Appl. No. 11/536,727, filed Sep. 29, 2006, Entitled "Media Terminal Adapter Local Ringback Option," Inventors: Burns, James M.

U.S. Appl. No. 11/536,024, filed Sep. 28, 2006, Entitled "Embedded Media Terminal Adapter Endpoint Redirect Mode," Inventor: Burns, James M.

U.S. Appl. No. 11/535,201, filed Sep. 26, 2006, Entitled "Media Terminal Adapter with Session Initiation Protocol (SIP) Proxy," Inventors: Moreman, et al.

Canadian Office Action dated Jan. 27, 2011 cited in Application No. 2,655,422.

U.S. Office Action dated Mar. 4, 2011 cited in U.S. Appl. No. 11/536,727.

Luan Dang, Cullen Jennings, David Kelly—Practical VOIP using VOCAL, 2002.

RFC 3015

RFC 2543

James Dahl Cable Television Laboratories et al., "Draft New Recommendation J.ipc2arch," ITU-T Draft Study Period 2005-2008, International Telecommunication Union, Geneva, CH, vol. Study Group 9, Aug. 2005, pp. 1-38.

Fred Baker Bill Foster Chip Sharp: "Cisco Architecture for Lawful Intercept In IP Networks; draft-baker-slem-architecture-02.txt;" IETF Standard-Working-Draft, Internet Engineering Task Force, IETF, CH, No. 2, Oct. 2003, XP015010527 ISSN: 0000-0004, p. 5-p. 13.

Baker Cisco Systems F: "Cisco Lawful Intercept Control MIB draft-baker-slem-mib-00; draft-baker-slem-mib-00.txt" IETF Standard-Working-Draft, Internet Engineering Task Force, IETF, CH, Apr. 2003, XP015015178 ISSN: 0000-0004, pp. 9, 23, 33.

International Search Report and Written Opinion mailed Dec. 28, 2007 cited in Application No. PCT/US2007/070692.

International Search Report and Written Opinion mailed Dec. 28, 2007 cited in Application No. PCT/US2007/074688.

International Search Report and Written Opinion dated Mar. 10, 2008 cited in PCT/US2007/079313.

International Search Report and Written Opinion mailed Mar. 18, 2008 cited in PCT/US2007/079309.

International Search Report and Written Opinion mailed Mar. 25, 2008 cited in PCT/US2007/079307.

EP Communication dated Jun. 4, 2009 cited in Application No. 07 798 275 9.

European Communication dated Sep. 30, 2009 cited in Application No. 07 853 604.2.

International Preliminary Report on Patentability mailed Mar. 10, 2010 cited in PCT/US2007/079313.

European Communication dated Apr. 9, 2010 cited in Application No. 07 853 608.3.

U.S. Official Action dated Dec. 20, 2007 in U.S. Appl. No. 11/535,201.

U.S. Official Action dated Jun. 13, 2008 in U.S. Appl. No. 11/535,201.

(56) References Cited

OTHER PUBLICATIONS

U.S. Official Action dated Oct. 16, 2008 in U.S. Appl. No. 11/535,201.
U.S. Official Action dated Mar. 5, 2009 in U.S. Appl. No. 11/535,201.
U.S. Official Action dated Sep. 4, 2009 in U.S. Appl. No. 11/535,201.
U.S. Official Action dated Sep. 30, 2009 in U.S. Appl. No. 11/425,862.
U.S. Official Action dated Dec. 10, 2009 in U.S. Appl. No. 11/461,487.
U.S. Official Action dated Mar. 17, 2010 in U.S. Appl. No. 11/425,862.
U.S. Official Action dated Mar. 29, 2010 in U.S. Appl. No. 11/536,024.
U.S. Official Action dated May 24, 2010 in U.S. Appl. No. 11/461,487.
U.S. Official Action dated Jun. 7, 2010 in U.S. Appl. No. 11/536,727.
U.S. Official Action dated Aug. 16, 2010 in U.S. Appl. No. 11/536,024.
U.S. Final Office Action dated Nov. 16, 2010 cited in U.S. Appl. No. 11/536,727.
U.S. Office Action dated Jan. 13, 2011 cited in U.S. Appl. No. 11/536,024.
U.S. Final Office Action dated Jun. 22, 2011 cited in U.S. Appl. No. 11/536,024.
Canadian Office Action dated Mar. 25, 2011 cited in Application No. 2,659,639.
Chinese First Office Action dated Mar. 16, 2011 cited in Application No. 200780023103.8.
U.S. Office Action dated Apr. 12, 2012 cited in U.S. Appl. No. 11/425,862, 16 pgs.
Canadian Office Action dated May 4, 2012 cited in Application No. 2,664,578, 5 pgs.
Canadian Office Action dated May 22, 2012 cited in Application No. 2,664,793, 2 pgs.
Canadian Office Action dated Jun. 21, 2012 cited in Application No. 2,655,422 , 2 pgs.
U.S. Final Office Action dated Aug. 11, 2011 cited in U.S. Appl. No. 11/536,727.
Canadian Office Action dated Sep. 8, 2011 cited in Application No. 2,655,422.
Canadian Office Action dated Jan. 21, 2013 cited in Application No. 2,655,422, 3 pgs.
Chinese Fourth Office Action dated Jan. 23, 2013 cited in Application No. 200780023103.8, 8 pgs.
Canadian Office Action dated Jan. 23, 2013 cited in Application No. 2,664,793, 2 pgs.
Canadian Office Action dated Feb. 10, 2012 cited in Application No. 2,659,639, 3 pgs.
Canadian Office Action dated Jan. 31, 2012 cited in Application No. 2,655,422.
Chinese Third Office Action dated Jul. 25, 2012 cited in Application No. 200780023103.8, 16 pgs.
Canadian Office Action dated Aug. 1, 2012 cited in Application No. 2,664,706, 2 pgs.
Chinese Second Office Action dated Feb. 13, 2012 cited in Application No. 200780023103.8, 10 pgs.
Canadian Office Action dated Jun. 26, 2013 cited in Application No. 2,655,422, 2 pgs.
Canadian Office Action dated Jun. 26, 2013 cited in Application No. 2,664,793, 2 pgs.
European Office Action dated Oct. 2, 2013 in Application No. 07 853 608.3, 4 pgs.

* cited by examiner

MEDIA TERMINAL ADAPTER (MTA) ROUTING OF TELEPHONE CALLS BASED ON CALLER IDENTIFICATION INFORMATION

FIELD OF THE INVENTION

This invention relates in general to telephony systems over broadband, more specifically broadband over coaxial cable, and more particularly, to the field of enabling a media terminal adapter to route received telephone calls based on caller identification information.

DESCRIPTION OF THE RELATED ART

Broadband communications systems, such as satellite and cable television systems, are now capable of providing many services in addition to broadcast audio/video signals over their existing systems. Some advanced services in a broadband communications system along with providing conventional cable television signals are telephony services, such as high-speed data and telephone. To support these services, cable modems with embedded or standalone media terminal adapters (MTAs) are used in the subscriber's premises and have typically been coupled to coaxial cable in a communications network. U.S. Pat. No. 6,161,011 to Loveless, the disclosure and teachings of which are incorporated herein by reference, shows an example of a hybrid fiber/coaxial (HFC) communications network that could be used to implement the present invention.

Conventionally, telephony calls that are transmitted to a subscriber's house having telephony service are delivered to all telephones connected to the line. Therefore, all telephones ring indicating an incoming call. Understandably, however, an incoming telephone call is typically directed to just one member of the house. For example, a child may be receiving telephone calls from their friends, and a father may be expecting calls from work. With caller identification on a telephone, a member of the house may determine who is calling and then direct the intended member of the house to answer the telephone; otherwise, there is no way to know which member of the house should answer the incoming telephone call. Thus, there exists a need for a routing method and system to determine the incoming caller information and then routing the incoming call to an appropriate telephone based on the intended receiver.

BRIEF DESCRIPTION OF THE DRAWINGS

The invention can be better understood with reference to the following drawings. The components in the drawings are not necessarily drawn to scale, emphasis instead being placed upon clearly illustrating the principles of the invention. In the drawings, like reference numerals designate corresponding parts throughout the several views.

DETAILED DESCRIPTION OF THE PREFERRED EMBODIMENT

Preferred embodiments of the invention can be understood in the context of a broadband communications system. Note, however, that the invention may be embodied in many different forms and should not be construed as limited to the embodiments set forth herein. All examples given herein, therefore, are intended to be non-limiting and are provided in order to help clarify the description of the invention.

The present invention is directed towards routing incoming telephone calls within a local network, such as a residence, to an intended receiving telephone(s). More specifically, a routing table is configured to include caller identification information on all incoming telephone calls and their corresponding receiving telephone addresses located in the local network. In this manner, once the routing table is configured, all defined incoming calls are routed to just the desired telephone(s). For example, the routing table is configured with a home office telephone having an Internet Protocol (IP) address that is the only telephone in the residence that is programmed to receive incoming work-related telephone calls. A media terminal adapter (MTA) receives the incoming defined telephone calls and routes the calls to a router or hub. The actual routing table preferably resides in the MTA and the hub/router provides multi-device access and possibly Network Address Translation (NAT). Depending upon the definitions in the routing table, the MTA then routes the work-related telephone calls to the desired home office telephone. The present invention will now be described in more detail hereinbelow.

Figure 1:
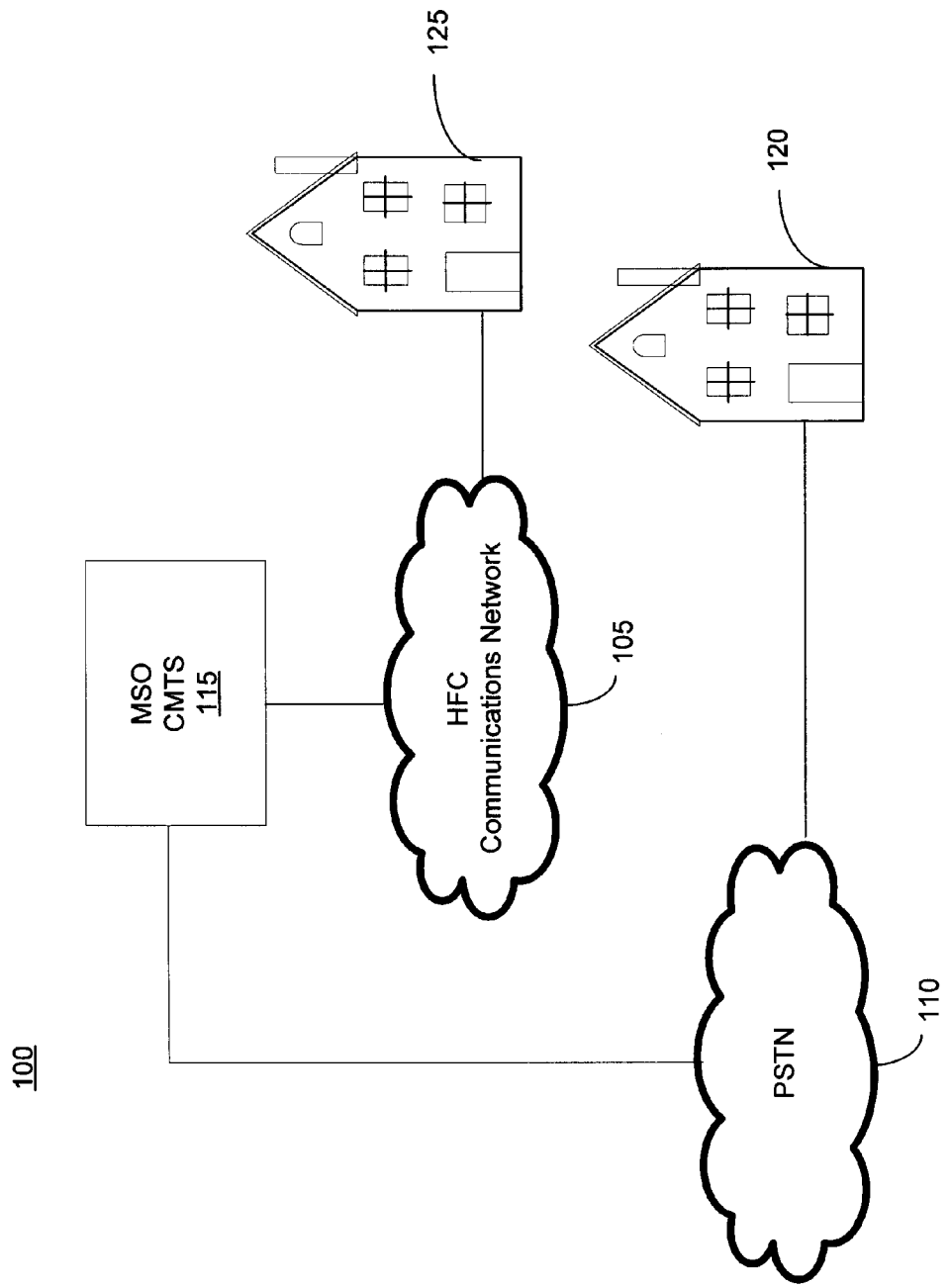
FIG. 1 is a block diagram of a communications system that is suitable for transmitting voice and data signals over both an HFC communications network and a public switched telecommunications network (PSTN).

FIG. 1 is a block diagram of a communications system 100 that is suitable for transmitting voice and data signals over both an HFC communications network 105 and a public switched telecommunications network (PSTN) 110. A multiple service operator (MSO) receives telephone calls from the PSTN 110 and then routes them through the HFC communications network 105 using a cable modem termination system (CMTS) 115. In this manner, a call originating from a subscriber 120 that is located off the PSTN 110 can terminate at a subscriber 125 that is located off the HFC communications network 105.

Figure 2:
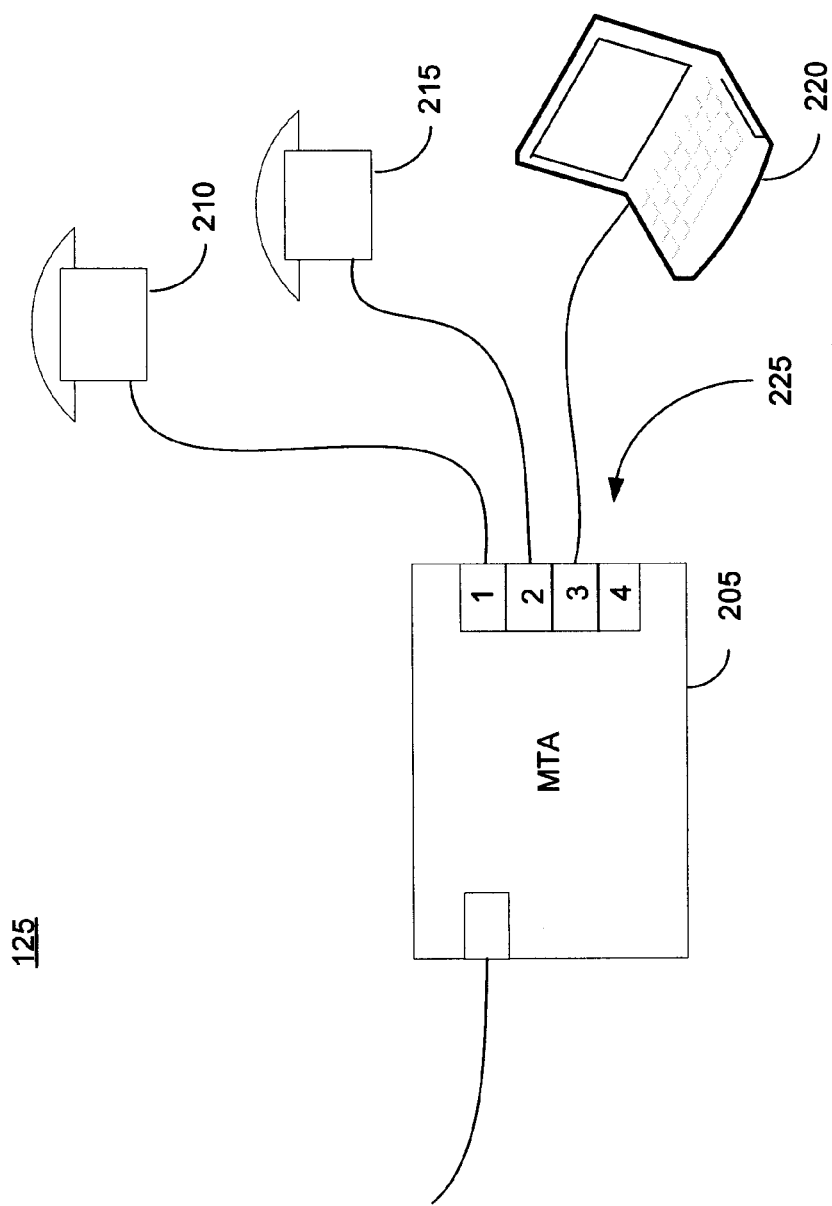
FIG. 2 is a block diagram of the subscriber having an MTA with a connected analog telephone, digital telephone, and a computer with an included soft telephone.

FIG. 2 is a block diagram of the subscriber 125 having an MTA 205 with a connected analog telephone 210, digital telephone 215, and a computer 220 with an included soft telephone. Radio frequency (RF) cable typically connects the MTA 205 to the HFC communications network 105. The MTA 205 then receives incoming telephone calls and routes the calls to the telephones via output ports 225. Each telephone 210, 215, 220 then receives the signal to ring signaling an incoming call, and, the user is then capable of answering the call from any of the telephones 210, 215, 220.

Figure 3:
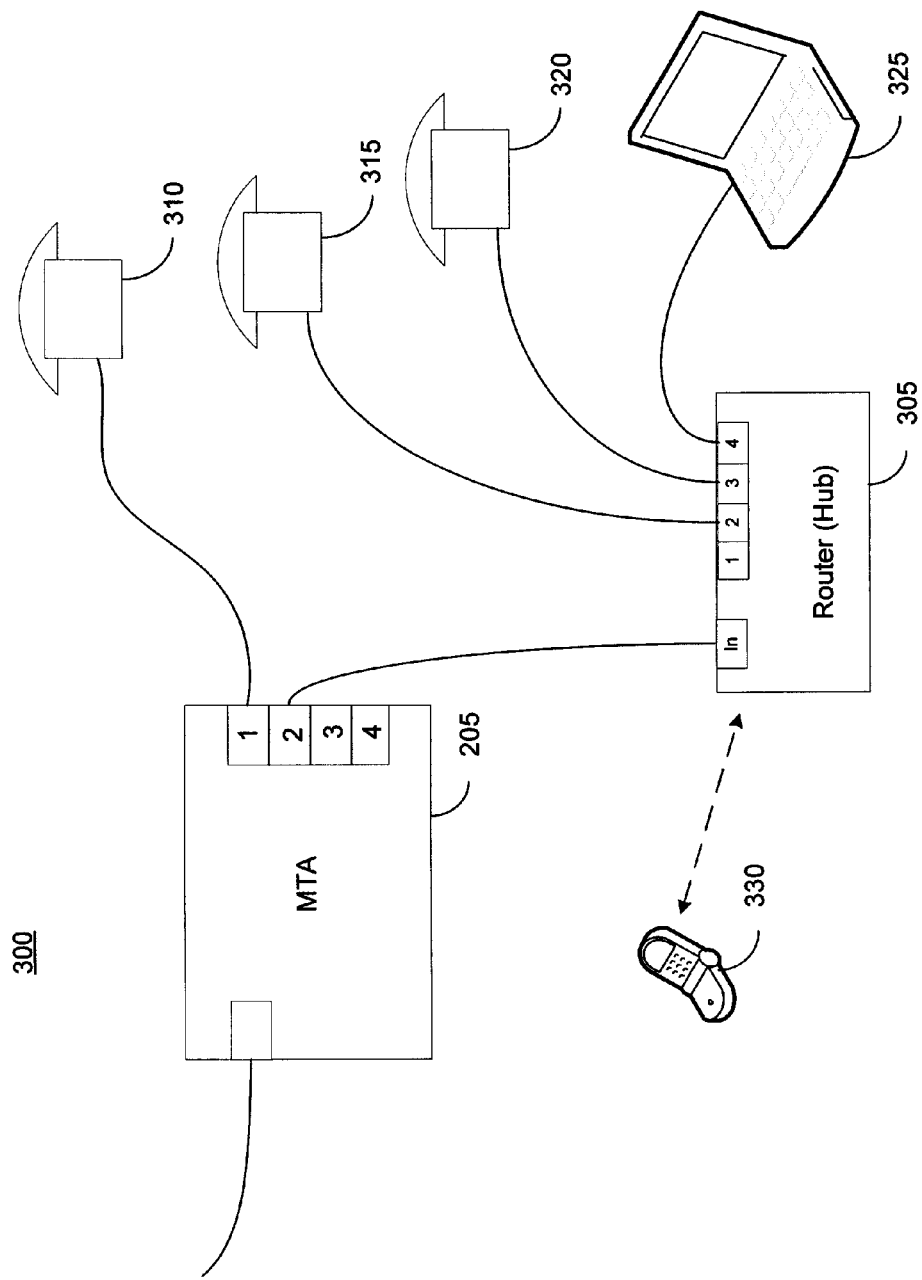
FIG. 3 is a block diagram of a subscriber's house having an MTA coupled to a router/hub for routing incoming telephone calls based on caller identification information to an intended receiver in accordance with the present invention.

FIG. 3 is a block diagram of a subscriber 300 having an MTA 302 coupled to a router or hub 305 for routing incoming telephone calls based on caller identification information to an intended telephone in accordance with the present invention. Each incoming telephone call has attached caller identification information, such as an originating caller name and telephone number. Accordingly, the incoming telephone call is provided to the router 305 via the MTA 302 and instructions for delivery to the desired telephone based on definitions configured in the routing table. The desired telephone may be an analog telephone 310, which may be physically located downstairs, that is connected to an interface on the MTA 302. If there is more than one analog telephone, each one is physically connected to the MTA 302 at a different interface Line (e.g., Line 1, Line 2, etc.). Additional desired telephones that are connected to the router 305 and accessed via their Internet address may be a digital Internet protocol (IP) telephone 315, which may be physically located in a guest room; an IP telephone 320, which may be physically located in a daughter's room; and a home office computer 325 with a soft telephone, which may be physically located in a downstairs office. Additionally, a wireless IP telephone 330 may also be utilized to receive only intended incoming telephone calls based on the routing table. As mentioned in the previous example, when an incoming work-related telephone call is received, the MTA 302 routes the work-related telephone call using its related caller identification information and the routing table definitions to just the home office computer 325. It will be appreciated that the signaling protocol used between the MTA 302 and the IP telephones 315, 320, 325, 330 may be Session Initiation Protocol (SIP), GR303 in a real time processing (RTP) stream, or some other simplified protocol.

Figure 4:
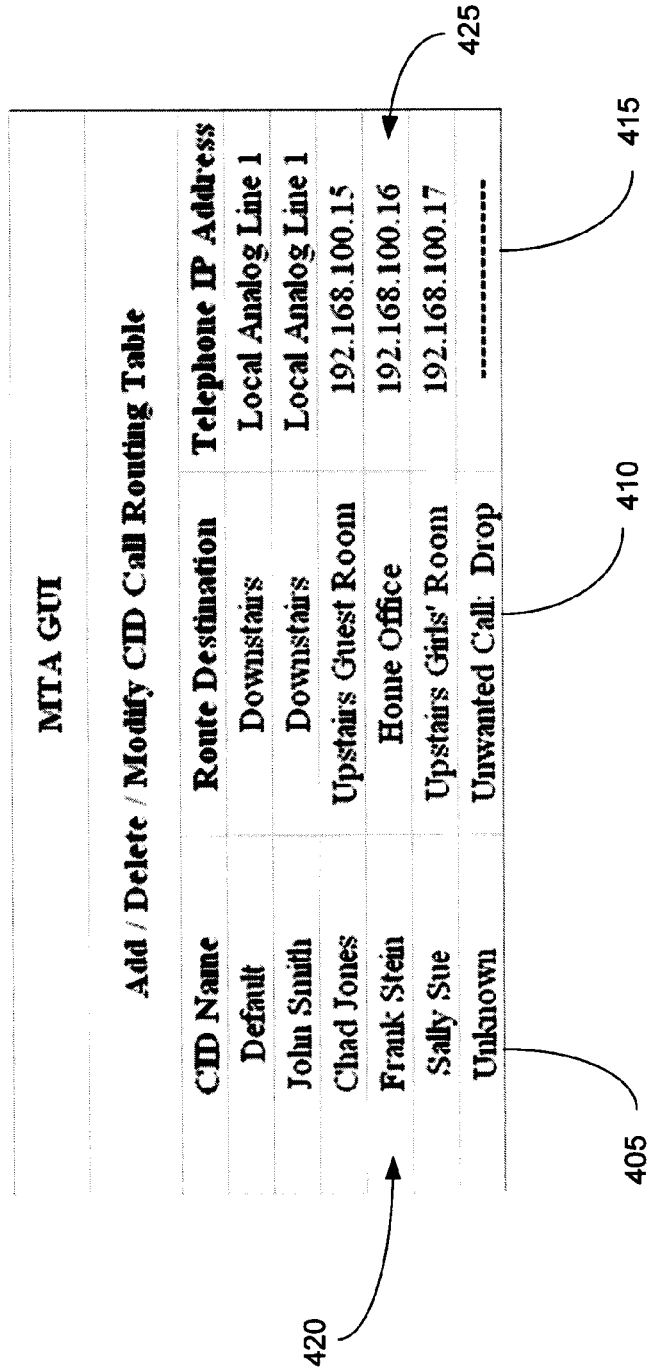
FIG. 4 is an example graphical user interface (GUI) that is suitable for use in the present invention of FIG. 3 where one can add, delete, or modify an incoming telephone call routing table.

FIG. 4 is an example graphical user interface (GUI) 400 that is suitable for use in the present invention of FIG. 3 where one can add, delete, or modify an incoming telephone call routing table. The GUI 400, which may be downloaded software or a web page, may reside on the MTA's internal web interface, the home office computer 325, or other computer within the subscriber's premise, or alternatively at a server located at the MSO. The GUI 400 includes the configurable routing table that specifies which coupled telephones receive certain incoming telephone calls based on each call's caller identification information. First, a user would enter a caller identification name in the CID name column 405. Next, an optional routing destination name, such as identifying names like downstairs; upstairs; home office, etc., is entered into a route destination column 410. Finally, the routing destination address is entered in a telephone IP address column 415. The routing destination address is the telephone's IP address; for example, the telephone that is physically located in the upstairs guest room has an IP address of 192.168.100.15, or it may be the physical MTA interface port, for example, the analog telephone 310 connected to Line 1. Returning to the above-mentioned example, an incoming call from Frank Stein 420 is intended for just the home office telephone, which has a telehone IP address 425 of 192.168.100.16.

Unassigned telephone calls may be routed to all telephones in a known manner or, alternatively, may be routed to one specified telephone, such as the home office telephone 325. Additionally, the routing table GUI 400 may store all the incoming caller identification information for future use. In this manner, a user may periodically display the list of all unassigned incoming calls and assign them to a desired telephone. Additionally, unknown caller identification information associated with incoming telephone calls, such as calls from solicitors, may be dropped altogether and not routed to any of the telephones 310, 315, 320, 325, 330.

Accordingly, systems and methods have been provided that enables an MTA and router to utilize the caller identification information and route incoming calls to a desired telephone. It will be appreciated that further embodiments are envisioned that implement the invention, for example, using all software or adding modes for additional features and services.

What is claimed is:

1. A method for routing incoming telephone calls within a residence having a local area network, each incoming telephone call having caller identification information, the method comprising the steps of:

receiving an incoming telephone call;

retrieving, from a media terminal adapter (MTA) located inside the residence and connected to a router, a routing table, wherein the routing table comprises a first column having incoming caller information, a second column having destination address information, and a third column identifying a location of at least one telephone inside the residence associated with the destination address information, wherein the location of the at least one telephone comprises a specific identification of a location of where inside the residence the at least one telephone is located, wherein the identification of the location further comprises identification of specific rooms and areas of the residence, wherein the destination address information comprises: a telephone number of the at least one telephone inside the residence and connected to the MTA, an internet protocol (IP) address of at least one IP phone connected to the router, and a type of connection interface between the MTA and the at least one telephone, wherein the type of connection interface comprises a wireless interface and an analog interface, and wherein the incoming caller identification information includes an originating caller name and originating telephone number; and performing a lookup operation on the routing table for the incoming telephone call, wherein performing the lookup operation comprises:

identifying the caller information for the incoming telephone call, and identifying the destination address information corresponding to the identified caller information, and routing the incoming telephone call to a telephone corresponding to the identified destination address information, wherein routing comprises determining the type of connection interface between the MTA, wherein when the interface is the wireless interface wirelessly routing the incoming telephone call to the telephone, and wherein when the interface is analog interface routing the incoming telephone call to the telephone via the physical connection interface;

wherein the routing table is accessible to a user accessing, by a user, the routing on a graphical user interface (GUI), wherein the GUI resides on the MTA and is accessible on a computer connected to the MTA and located inside the residence, and wherein the GUI is configured to periodically display a list of all stored unassigned incoming calls;

wherein the routing table is configurable by the user, wherein configuring the routing table comprises: entering the incoming caller information in the first column, entering the destination address information of the at least one telephone in the second column, and entering an identification of the location of the at least one telephone inside the residence in the third column;

wherein configuring the routing table further comprises assigning the unassigned incoming calls to the at least one telephone inside the residence, wherein assigning the unassigned incoming calls comprises assigning a specific destination address and a specific location inside the residence; and wherein when an unassigned incoming telephone call is received and the incoming caller information is not in the routing table, the MTA is configured to route the unassigned incoming telephone call to a specific telephone located on the local area network and designated by the user.

2. The method of claim 1, further comprising the step of defining the at least one telephone in the routing table by physical connection interface.

3. The method of claim 1, further comprising not routing the unassigned incoming telephone call to any telephone within the local network.

4. The method of claim 1, further comprising:
routing the unassigned incoming telephone call to the specific telephone; and
storing the unassigned incoming telephone call in the routing table.

5. The method of claim 1, further comprising routing the assigned incoming telephone call to any analog telephones within the local network via a physical connection interface.

6. The method of claim 1, further comprising the step of dropping any incoming telephone call not having attached the incoming caller information.

7. A system for receiving and routing incoming telephone calls, the system comprising:
a routing table, residing in a media terminal adapter (MTA) connected to a router, for assigning caller identification information to at least one telephone located within a residence having a local area network and for assigning an incoming telephone call to one or more of the at least one telephone, wherein the routing table comprises:
a first column having incoming caller information,
a second column having destination address information, wherein the destination address information comprises: a telephone number of at least one phone inside the residence and connected to the MTA, and an internet protocol (IP) address of at least one IP phone connected to the router, and a type of connection interface between the MTA and the at least one telephone, wherein the type of connection interface comprises a wireless interface and an analog interface, and
a third column identifying a location of the at least one telephone inside the residence, wherein the location of the at least one telephone comprises a specific identification of a location of where inside the residence the at least one telephone is physically located; and
a graphical interface for configuring the routing table, wherein configuring the routing table comprises: entering the incoming caller information in the first column, entering the destination address information of the at least one telephone in the second column, and entering an identification of the location of the at least one telephone inside the residence in the third column,
wherein when an incoming telephone call is received at the residence, the MTA is configured to perform a lookup operation on the routing table for the caller identification information, identify a destination address corresponding to the caller information, and route the incoming telephone call to a telephone corresponding to the identified destination address in accordance with the routing table, wherein routing comprises determining the type of connection interface between the MTA, wherein when the interface is the wireless interface wirelessly routing the incoming telephone call to the telephone, and wherein when the interface is analog interface routing the incoming telephone call to the telephone via the physical connection interface;
wherein configuring the routing table further comprises assigning the unassigned incoming calls to the at least one telephone inside the residence, wherein assigning the unassigned incoming calls comprises assigning a specific destination address and a specific location inside the residence; and
wherein when an unassigned incoming telephone call is received and the incoming caller information is not in the routing table, the MTA is configured to route the unassigned incoming telephone call to a specific telephone located on the local area network and designated by a user.

8. The system of claim 7, wherein the router routes the assigned incoming telephone call to the at least one telephone by an Internet Protocol address of each of the at least one telephone.

9. The system of claim 7, wherein the incoming unassigned telephone call is stored in the routing table, and wherein the stored unassigned telephone call is subsequently assigned to one or more of the at least one telephone.

10. The system of claim 7, wherein the at least one telephone may be an analog telephone, a digital telephone, a computer softphone, or a wireless cellphone.

11. The system of claim 7, wherein the router is configured to drop the incoming telephone call when the incoming telephone call does not include attached the incoming caller information.

12. The system of claim 7, the MTA is configured to receive the incoming telephone calls via coaxial cable from a communications network, and route the incoming telephone calls to at least one of an analog connection interface and the router.

13. The system of claim 7, wherein the routing table may be updated via an MTA web interface, a coupled computer, or a remote server.

14. An apparatus comprising a memory and a processor, wherein the memory comprises a set of instructions which when executed by the processor perform a method comprising:
receiving an incoming telephone call;
retrieving, from a media terminal adapter (MTA) located inside the residence having a local area network and connected to a router, a routing table, wherein the routing table comprises a first column having incoming caller information, a second column having destination address information, and a third column identifying a location of at least one telephone inside the residence associated with the destination address information, wherein the location of the at least one telephone comprises a specific identification of a location of where inside the residence the at least one telephone is located, wherein the identification of the location further comprises identification of specific rooms and areas of the residence, wherein the destination address information comprises: a telephone number of the at least one telephone inside the residence and connected to the MTA, an internet protocol (IP) address of at least one IP phone connected to the router, and a type of connection interface between the MTA and the at least one telephone, wherein the type of connection interface comprises a wireless interface and an analog interface, and wherein the incoming caller identification information includes an originating caller name and originating telephone number; and
performing a lookup operation on the routing table for the incoming telephone call, wherein performing the lookup operation comprises:
identifying the caller information for the incoming telephone call, and identifying the destination address information corresponding to the identified caller information, and routing the incoming telephone call to a telephone corresponding to the identified destination address information, wherein routing comprises determining the type of connection interface between the MTA, wherein when the interface is the wireless interface wirelessly routing the incoming telephone call to the telephone, and wherein when the interface is analog interface routing the incoming telephone call to the telephone via the physical connection interface;

wherein the routing table is accessible to a user on a graphical user interface (GUI), wherein the GUI resides on the MTA and is accessible on a computer connected to the MTA and located inside the residence, and wherein the GUI is configured to periodically display a list of all stored unassigned incoming calls;

wherein the routing table is configurable by the user, wherein configuring the routing table comprises: entering the incoming caller information in the first column, entering the destination address information of the at least one telephone in the second column, and entering an identification of the location of the at least one telephone inside the residence in the third column;

wherein configuring the routing table further comprises assigning the unassigned incoming calls to the at least one telephone inside the residence, wherein assigning the unassigned incoming calls comprises assigning a specific destination address and a specific location inside the residence; and wherein when an unassigned incoming telephone call is received and the incoming caller information is not in the routing table, the MTA is configured to route the unassigned incoming telephone call to a specific telephone located on the local area network and designated by the user.

\* \* \* \* \*